(12) United States Patent
Nakamura et al.

(10) Patent No.: US 7,366,102 B2
(45) Date of Patent: Apr. 29, 2008

(54) FAULT ISOLATION SYSTEM AND METHOD

(75) Inventors: Neal Y. Nakamura, Honolulu, HI (US); Earl M. Ishihara, Mililani, HI (US)

(73) Assignee: Time Warner Cable, Stamford, CT (US)

( * ) Notice: Subject to any disclaimer, the term of this patent is extended or adjusted under 35 U.S.C. 154(b) by 618 days.

(21) Appl. No.: 11/040,391

(22) Filed: Jan. 21, 2005

(65) Prior Publication Data

US 2006/0165001 A1 Jul. 27, 2006

(51) Int. Cl.
*G01R 31/08* (2006.01)
*G06F 11/00* (2006.01)
*G08C 15/00* (2006.01)

(52) U.S. Cl. ............... 370/244; 370/250; 370/217; 370/216; 370/229

(58) Field of Classification Search ............ 370/244, 370/217, 250, 216, 229; 361/63, 44; 398/13; 702/59; 714/1, 25; 324/66, 512, 500, 528, 324/200

See application file for complete search history.

(56) References Cited

U.S. PATENT DOCUMENTS 5,519,830 A * 5/1996 Opoczynski .................. 714/4
6,272,150 B1 * 8/2001 Hrastar et al. ............. 370/486

\* cited by examiner

*Primary Examiner*—Benny Q. Tieu
*Assistant Examiner*—Nima Mahmoudzadeh
(74) *Attorney, Agent, or Firm*—Roberts Mardula & Wertheim, LLC

(57) ABSTRACT

A fault isolation system and method. A hierarchical numbering system is applied to devices within a cable network. Each subscriber is associated with a "last active device" or "LAD" providing service to that subscriber. The numbering system provides "genealogical" information about the subscriber's LAD so that the LAD can be located within the network. By correlating trouble reports from subscribers, a fault in an active device can be isolated to a particular segment of a cascade if not a particular active device. The number system comprises a continuously concatenated string that provides a relative location of each active device with a cable network.

15 Claims, 4 Drawing Sheets

FAULT ISOLATION SYSTEM AND METHOD

BACKGROUND

Embodiments of the present invention are directed generally to cable network fault isolation and more specifically to the isolation of faults in devices comprising the cable plant.

Cable networks deliver voice, data, and video to subscribers over a complex web of hubs, nodes, amplifiers, line extenders, and passive devices. Network management practices typically include device numbering systems to facilitate network topographical management. Device numbering systems are hierarchical thereby mimicking the trunk/cascade structure of the network itself. A well-implemented numbering system provides information about the physical location of a particular device within a network and the other devices to which the particular device connects.

Device numbering systems are generally designed to identify a device within a network to a level within the network deemed useful for network management. That is, a numbering system is used to manage network traffic, schedule maintenance, identify available capacity, balance loads among devices, and other important tasks. However, such a device numbering system is not able to isolate network problems to a device or cascade level.

FIG. 1 illustrates a typical cable system architecture. A headend 100 communicates with hub 105. Hub 105 comprises a cable modem termination system and switching/routing components. Hub 105 communicates with nodes 120A, 120B, 120. Nodes 120 provide an interface between the fiber-based transport medium of the cable network (between the headend 100 and upstream side of nodes 120) and the coax-based medium (between the downstream side of nodes 120 and the subscriber interface 145). The downstream side of node 120B is further illustrated as connecting to bridger amplifier 1 125 which in turn is connected to bridger amplifier 2 130. The serial path from node 120B through bridger amplifier 1 125 to bridger amplifier 2 130 is referred to as a cascade relative to node 120B. Bridger amplifier 1 125 has three branches that are cascades relative to bridger amplifier 1 125 and sub-cascades relative to node 120B.

As will be appreciated by those skilled in the art, FIG. 1 is a greatly simplified schematic of a cable network architecture. A hub typically serves 20,000 subscribers. A typical hub support from 100 nodes with each node capable of serving 2000 subscribers. In order to maintain signal quality and quality of service commitments, trunk amplifiers maintain high signal quality. Internal bridger modules in the trunk amplifiers boost signals for delivery to subscribers' homes. Line Extender amplifiers maintain the high signal levels in cascade after the trunk amplifiers, through the neighborhoods. Taps divide out small amounts of signal for connection to the homes. They typically have 2, 4 or 8 ports for connection of drop cables. Nominal cascade limits are up to 4 trunk amplifiers followed by up to 3 line extenders, with more in very rural areas. In suburban areas, cascades typically comprise 2 trunk and 2 line extenders. Because branching is unlimited, the total device count per node may be large despite short cascades.

Because of the number of devices in a cable network, identifying the cause of an outage can be a daunting problem. Cable network troubleshooting is often time consuming and craft/skill dependant in a sequence of staff positions. Customer service must interpret and correlate customer complaints, dispatch must efficiently contact and direct the maintenance crew, and the maintenance crew must efficiently troubleshoot a geographically dispersed system.

What is needed is a means for automating the process of isolating faults in a cable network that does not require re-engineering of the network or replacement of existing equipment.

SUMMARY

An embodiment of the present invention provides a method for isolating faults in cable network equipment located within cable network segment. In this embodiment, a "last active device" or "LAD" hierarchical numbering system is applied to the active devices within the cable network. A hub is assigned a hub identifier. Each node that connects to a hub is assigned an identifier comprising a unique node identifier concatenated with the hub identifier of the hub to which the node is connected. Each bridger amplifier that connects to a node is represented by an identifier comprising a cascade and amplifier identifier concatenated with the node identifier of the node to which the amplifier is connected. Successive downstream bridger amplifiers in the cascade are indicated by concatenating the nearest upstream bridger amplifier identifier with the downstream bridger amplifier identifier.

A line extender (or "LE") in a cascade is indicated by a decimal. The LE is represented by an identifier comprising an LE identifier concatenated with the amplifier identifier using a decimal point as a separator. The numbering system is indeterminate allowing the identification of devices to the subscriber termination.

Fault isolation is accomplished by correlating trouble reports among subscribers with network devices common to those subscribers affected by a fault. Each device in the cable network is assigned an identification number and each subscriber account is assigned the identification of an appropriate connecting device. When a degradation or loss of data connections with customer premise devices such as cable modems and digital set top boxes occur, the device identifiers of the subscribers are grouped by hub and node and sorted. The sorting process causes the first common point of failure to move to the top of the group. The identification number may then be searched in the engineering database for location, description and mapping information for the field crew to act upon.

It is therefore an aspect of the present invention to isolate a fault within a cable network based on subscriber trouble reports.

It is another aspect of the present invention to implement a network device numbering system that facilitates the isolation of faults within the network.

It is a further aspect of the present invention to poll active subscriber devices to determine the status of the network path to that device and to correlate non-responses with a network numbering system that facilitates the isolation of faults within the network It is yet another aspect of the present invention to reduce the time and resources needed to identify and rectify a network fault.

These and other aspects of the present invention will become apparent from a review of the general and detailed descriptions that follow.

An embodiment of the present invention provides a method for isolating a fault in a cable network. Devices in the network are assigned a device identifier comprising a first character field comprising a hub identifier and a second character field concatenated with the first character field comprising a node identifier. In one embodiment of the present invention, the hub identifier is concatenated to the right of the node identifier. Alternatively, the hub identifier may be concatenated to the left of the hub identifier without departing from the scope of the present invention. Subsequent character fields are concatenated with the second character field comprising a cascade number. The value of the cascade number identifies a branch of the network relative to a device from which the branch emanates.

A first separator is interposed into the device identifier before a subsequent character field indicative of a branch from a first level active device that terminates at a second level active device. By way of illustration and not as a limitation, a first level active devices comprises a bridger/amplifier and a second level active device comprises a line extender and an apartment amplifier.

A second separator is interposed into the device identifier before a subsequent character field indicative of a branch from an active device that terminates at a passive device. By way of illustration and not as a limitation, a passive device comprises a line tap. The assigned device identifier facilitates isolating a failed network device.

In yet another embodiment of the present invention, non-responsive subscriber devices connected to the network through an active device are identified. In an embodiment of the present invention, identification of non-responsive devices is accomplished by reviewing outage reports from subscribers. Alternatively, subscriber set top boxes are polled. Set top boxes that fail to respond to the poll are identified.

The network identifier of the last active device through which each non-responsive subscriber device connects to the network is obtained. The last active device identifiers associated with non-responsive subscriber devices are correlated to identify a furthest upstream active device as a likely common cause of the non-responsiveness of the non-responsive subscriber devices.

DETAILED DESCRIPTION

Figure 1:
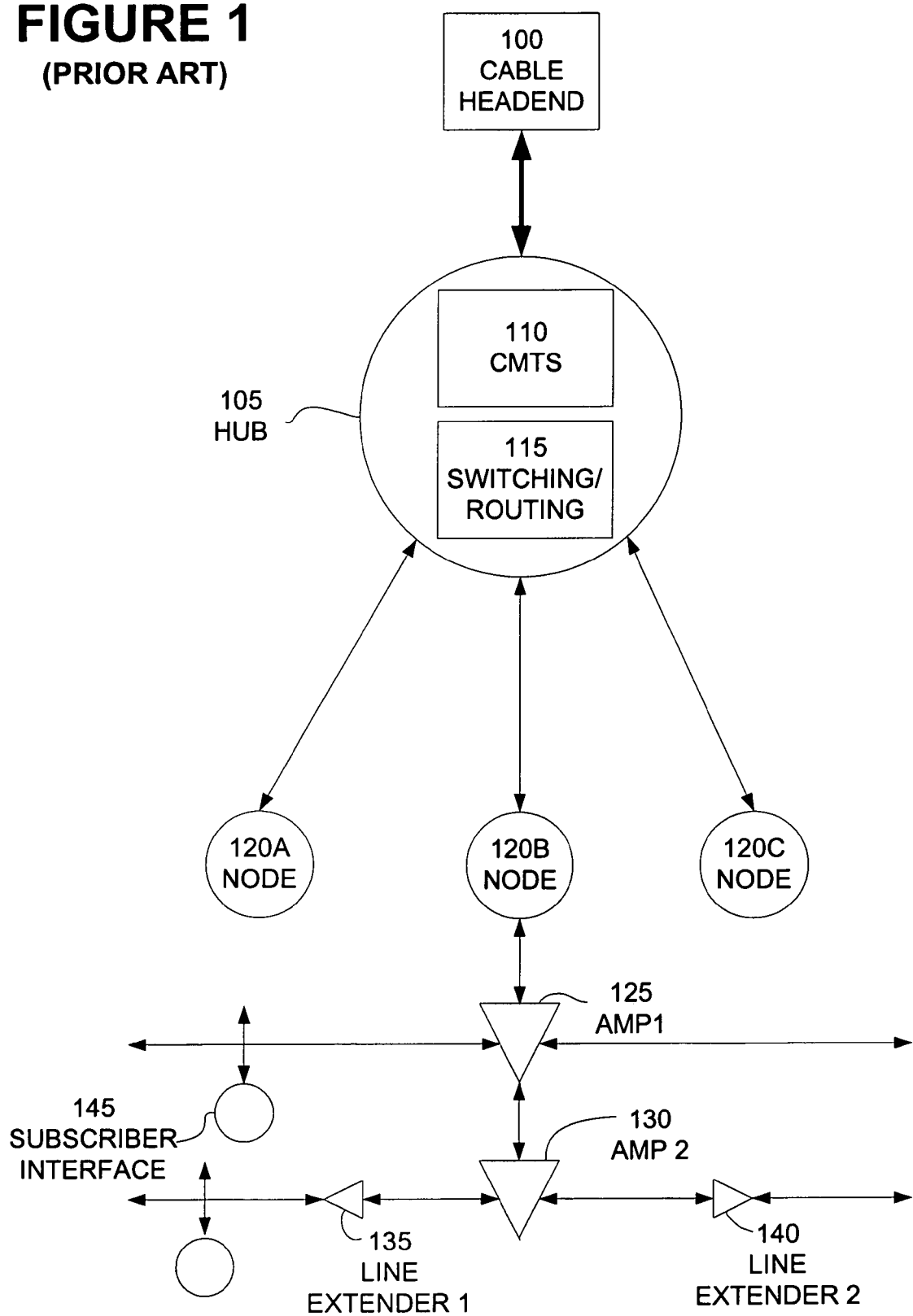
FIG. 1 a typical cable network architecture.

The following terms are used in the description that follows. The definitions are provided for clarity of understanding:

| & - | Concatenation function. |
|---|---|
| Bridger Amplifier - | Trunk/Bridger amplifiers amplify and reamplify cable signals for transmission through a cable television trunk system and out to the distribution system. They provide the interface between the trunk and distribution systems. Also called a bridger or a trunk/bridger amplifier. |

-continued

| Cascade - | A serial path extending from an active device. |
|---|---|
| Hub - | The local source of cable services. By way of illustration and not as a limitation, a hub may server 20,000 subscribers. |
| Hybrid Fiber Coax (HFC) - | A network design that employs both fiber optic and coaxial cables to deliver cable video and data services. |
| Line extender - | An amplifier that reamplifies the signal from the Trunk/Bridger amplifier. Taps that provide the cable connections to the homes are installed in the distribution cabling between the Trunk/Bridger amplifiers and the line extenders. |
| Node - | A device that provides an interface between the fiber optic and coaxial cable systems of an HFC cable system. Light from a fiber optic cable is converted into an electrical signal suitable for delivery in a coaxial cable system within this device. |
| Tap - | A passive device that divides out small amounts of signal for connection to the homes. They typically have 2, 4 or 8 ports for connection of drop cables. |

An embodiment of the present invention provides a method for isolating faults in cable network equipment located within cable network segment. In this embodiment, a "last active device" or "LAD" hierarchical numbering system is applied to the active devices within the cable network. A hub is assigned a hub identifier. Each node that connects to a hub is assigned an identifier comprising a unique node identifier concatenated with the hub identifier of the hub to which the node is connected. Each bridger amplifier that connects to a node is represented by an identifier comprising a cascade and amplifier identifier concatenated with the node identifier of the node to which the amplifier is connected. Successive downstream bridger amplifiers in the cascade are indicated by concatenating the nearest upstream bridger amplifier identifier with the downstream bridger amplifier identifier.

A line extender (or "LE") in a cascade is indicated by a decimal. The LE is represented by an identifier comprising an LE identifier concatenated with the amplifier identifier using a decimal point as a separator. The numbering system is indeterminate allowing the identification of devices to the subscriber termination.

Fault isolation is accomplished by correlating trouble reports among subscribers with network devices common to those subscribers affected by a fault. Each device in the cable network is assigned an identification number and each subscriber account is assigned the identification of an appropriate connecting device. When a degradation or loss of data connections with customer premise devices such as cable modems and digital set top boxes occur, the device identifiers of the subscribers are grouped by hub and node and sorted. The sorting process causes the first common point of failure to move to the top of the group. The identification number may then be searched in the engineering database for location, description and mapping information for the field crew to act upon.

The number system comprises a continuously concatenated string that provides a relative location of each active device with a cable network.

By way of illustration and not as a limitation, a device identifier may have the form: Hub & Node & Trunk & "." & LE & MDU & "." & Passive, where the "&" signifies concatenation of the identifier of the device to which the identified device is connected.

Figure 2:
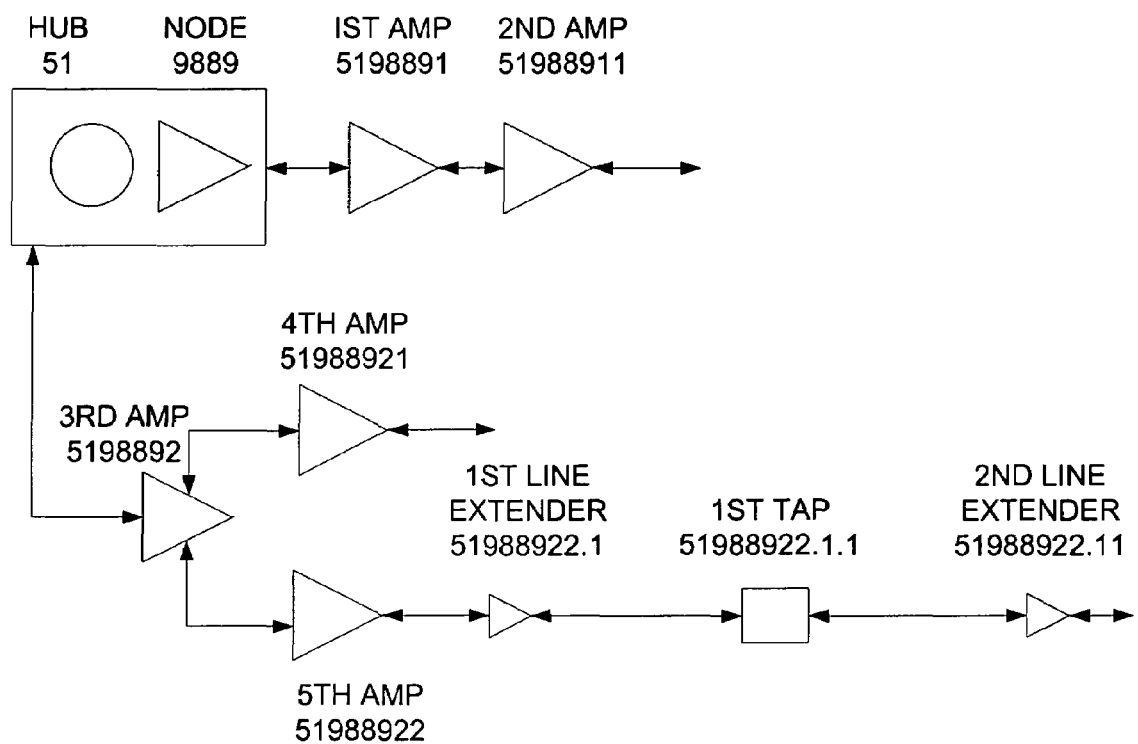
FIG. 2 illustrates a last active device numbering system according to an embodiment of the present invention.

FIG. 2 illustrates a LAD number system according to an embodiment of the present invention. While FIG. 2 illustrates fields within the device numbering system as having particular length, the present invention is not so limited. As will be appreciated by those skilled in the art, other field lengths may be used without departing from the scope of the present invention. The two left-most character positions identify hub 51. The next 4 positions identify the node and serving area 9889. Each subsequent place to the right indicates the bridger amplifier cascade position. As illustrated in FIG. 2, there are two bridger amplifiers cascaded with node 9889. A bridger amplifier connects to node 9889 and is identified with a "1" to signify that it is the first split, or cascade, from the node. The first bridger amplifier receives the device identifier 5198891 (selective bolding used for clarity). A second bridger amplifier connects to the first bridger amplifier and is identified with a cascade number (relative to the first bridger amplifier) of "1". The second bridger amplifier thus receives the identifier 51988911 (selective bolding used for clarity), where the first bolded "1" indicates that the second bridger amplifier is in the first cascade relative to node 9889 and the second bolded "1" indicates that the second bridger amplifier is in the first cascade relative to the first bridger amplifier. A third bridger amplifier also connects to node 9889 and is identified with a cascade number of "2" to signify that is the second cascade from the node. The third bridger amplifier receives the device identifier 5198892 (selective bolding used for clarity). A fourth bridger amplifier and a fifth bridger amplifier are connected to the third bridger amplifier. The fourth bridger amplifier is identified with a cascade number of "1" (relative to the third bridger amplifier) and receives the identifier 51988921 (selective bolding used for clarity). The fifth bridger amplifier is identified with a cascade number of "2" (relative to the third bridger amplifier) and receives the device identifier 51988922 (selective bolding used for clarity). A bridger amplifier connected to either the fourth or fifth bridger amplifier would be identified by a cascade number of "1" and a device identifier constructed by concatenating cascade number of with the device identifier of the device upstream from it.

A first line extender is connected to the fifth bridger amplifier 51988922. The first line extender receives a device identifier constructed by inserting a separator after the first amplifier identifier, identifying the first line extender by a "1," and concatenating the "1" with the first amplifier device identifier. As illustrated in FIG. 2, the separator is a "decimal" point. However, the present invention is not so limited. Any computer recognized non-numerical character may be used as separator without departing from the scope of the present invention. Referring again to FIG. 2, the first line extender receives a device identifier of 51988922.1. A tap, a passive device, is connected to first line extender 51988922.1. A second separator is used to identify a passive interface. The tap receives a device identifier of 51988922.1.1 (selective bolding used for clarity). A second line extender is connected to tap and receives a cascade number of "1." The second line extender receives a device identifier of 51988922.11 (selective bolding used for clarity).

The "genealogy" of an active device can be traced by parsing the device identifier backwards (or upstream). For example, line extender 51988922.11 is connected to:
cascade number 1 of line extender 51988922.1, which is connected to
cascade number 1 of amplifier 51988922, which is connected to
cascade number 2 of amplifier 5198892, which is connected to
cascade number 2 of node 9889 and hub 51.

Figure 3:
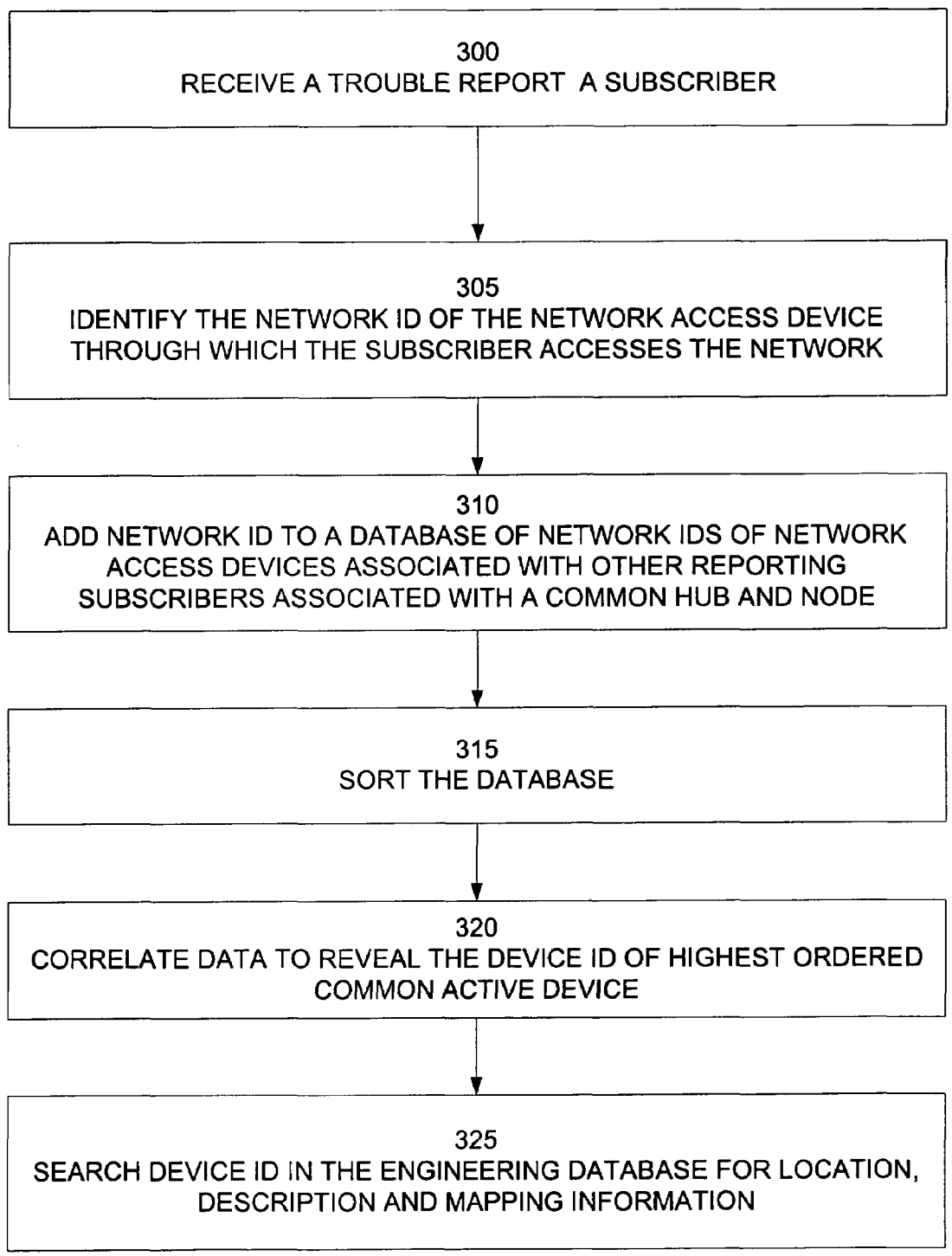
FIG. 3 illustrates of a flow of a process for isolating a fault in a cable network according to an embodiment of the present invention.

FIG. 3 illustrates a block diagram of a flow of a process for isolating a fault in a cable network according to an embodiment of the present invention. A trouble report is received from a subscriber 300. In an embodiment of the present invention, the trouble reports are generating by polling active subscriber devices (e.g., two-way set top boxes, cable modems) and waiting for a reply. A failure of a device to respond after a fixed period of time is indicative of a potential fault in the cascade leading to that subscriber's interface.

The subscriber account number is used to identify the network identifier of the LAD through which the subscriber accesses the network 305. The network identifier of the network access device associated with the reporting subscriber is added to a database comprising the network identifier of network access devices associated with other reporting subscribers associated with a common hub and node 310. The database is sorted 315 and the data is correlated to reveal the device identifier of highest ordered common active device 320. The device identifier is searched in the engineering database for location, description and mapping information 325.

Figure 4:
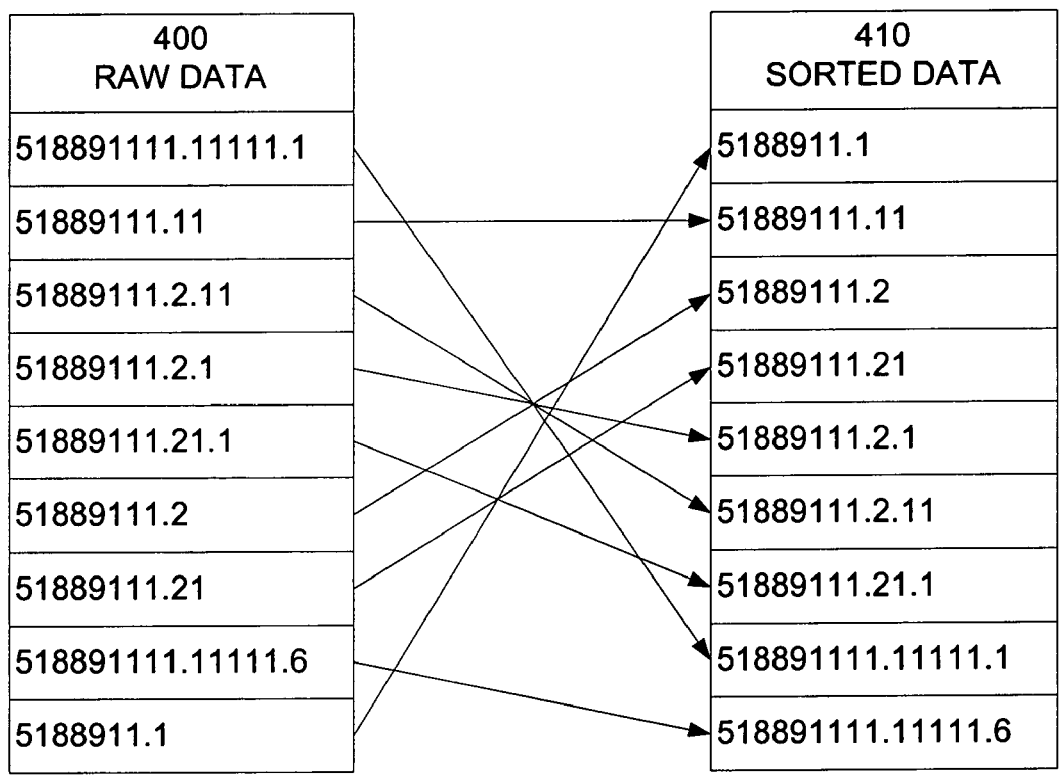
FIG. 4 illustrates the results of a sorting process performed on data acquired from a LAD numbered network according to an embodiment of the present invention.

FIG. 4 illustrates the results of a sorting process performed on data acquired from a LAD numbered network according to an embodiment of the present invention. Raw data 400 is sorted in ascending order according to sorting rules that order values in the following order: space-separator-number-letter. The sorted raw data 410 reveals a potential fault in bridger amplifier 5188911.1.

In another embodiment of the present invention, raw data 400 is further processed after the sorting is completed. By way of illustration and not as a limitation, successive single place "right trim" string operations performed on a given device number may be used to identify successive upstream devices. "Wildcard" string searches performed on a device number may be used to identify either all downstream devices or only the adjacent downstream devices depending on the search type. Wildcard string searches performed on a device number may be used to identify the customers impacted by the device. Wildcard queries that include the decimal location may be used to select customers and devices connected to the distribution outputs of a particular trunk/bridger while ignoring other downstream devices and customers connected to the trunk output.

A fault isolation system and method have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

We claim:

1. A method for isolating a fault in a cable network comprising:
    identifying devices in the network by assigning a device identifier comprising:
        a first character field comprising a hub identifier;
        a second character field concatenated with the first character field, wherein the second character field comprises a node identifier;
        subsequent character fields concatenated with the second character field, wherein a subsequent character field comprises a cascade number and wherein the value of the cascade number identifies a branch of the network relative to a device from which the branch emanates;

a first separator interposed into the device identifier before a subsequent character field indicative of a branch from a first level active device that terminates at a second level active device; and a second separator interposed into the device identifier before a subsequent character field indicative of a branch from an active device that terminates at a passive device;

wherein the assigned device identifier facilitates isolating a failed network device in the network.

2. The method for isolating a fault in a cable network of claim 1, wherein assigning a device identifier comprising a second character field concatenated with the first character field comprises assigning a device identifier comprising a second character field concatenated to the right of the first character field.

3. The method for isolating a fault in a cable network of claim 1, wherein assigning a device identifier comprising a second character field concatenated with the first character field comprises assigning a device identifier comprising a second character field concatenated to the left of the first character field.

4. The method for isolating a fault in a cable network of claim 1, wherein the first level active device comprises a bridger/amplifier.

5. The method for isolating a fault in a cable network of claim 1, wherein the second level active device is selected from the group consisting of a line extender and an apartment amplifier.

6. The method for isolating a fault in a cable network of claim 1, wherein the passive device comprises a line tap.

7. The method for isolating a fault in a cable network of claim 1 further comprising:

identifying non-responsive subscriber devices connected to the network through an active device;

obtaining the network identifier of the last active device through which each non-responsive subscriber device connects to the network;

correlating the last active device identifiers associated with non-responsive subscriber devices to identify a furthest upstream active device as a likely common cause of the non-responsiveness of the non-responsive subscriber devices.

8. The method for isolating a fault in a cable network of claim 7, wherein identifying non-responsive subscriber devices connected to the network through an active device comprises: polling subscriber devices connected to the network through an active device; and identifying subscriber devices that fail to respond to the poll.

9. The method for isolating a fault in a cable network of claim 8, wherein correlating the last active device identifiers associated with non-responsive subscriber devices to identify a furthest upstream active device as a likely common cause of the non-responsiveness of the non-responsive subscriber devices comprises sorting the last active device identifiers in ascending order.

10. A method for isolating a fault in a cable network comprising:

assigning active devices within the network identifiers indicative of the relative location of the active devices within a network architecture;

identifying non-responsive subscriber devices connected to the network through an active device;

obtaining the identifier of the last active device through which each non-responsive subscriber device connects to the network;

correlating the last active device identifiers associated with non-responsive subscriber devices to identify a furthest upstream active device as a likely common cause of the non-responsiveness of the non-responsive subscriber devices.

11. The method for isolating a fault in a cable network of claim 10, wherein identifying non-responsive subscriber devices connected to the network through an active device comprises:

polling subscriber devices connected to the network through an active device; and identifying subscriber devices that fail to respond to the poll.

12. The method for isolating a fault in a cable network of claim 10, wherein correlating the last active device identifiers associated with non-responsive subscriber devices to identify a furthest upstream active device as a likely common cause of the non-responsiveness of the non-responsive subscriber devices comprises sorting the last active device identifiers in ascending order.

13. The method for isolating a fault in a cable network of claim 10, wherein assigning active devices within the network identifiers indicative of the relative location of the active devices within a network architecture comprises assigning a device identifier comprising:

a first character field comprising a hub identifier;

a second character field concatenated with the first character field, wherein the second character field comprises a node identifier;

subsequent character fields concatenated to with the second character field, wherein a subsequent character field comprises a cascade number and wherein the value of the cascade number is identifies a branch of the network relative to a first level active device from which the branch emanates;

a first separator interposed into the device identifier before a subsequent character field indicative of a branch from a first level active device that terminates at a second level active device; and a second separator interposed into the device identifier before a subsequent character field indicative of a branch from an active device that terminates at a passive device.

14. The method for isolating a fault in a cable network of claim 13, wherein assigning a device identifier comprising a second character field concatenated with the first character field comprises assigning a device identifier comprising a second character field concatenated to the right of the first character field.

15. The method for isolating a fault in a cable network of claim 13, wherein assigning a device identifier comprising a second character field concatenated with the first character field comprises assigning a device identifier comprising a second character field concatenated to the left of the first character field.

* * * * *

UNITED STATES PATENT AND TRADEMARK OFFICE
CERTIFICATE OF CORRECTION

PATENT NO. : 7,366,102 B2  Page 1 of 1
APPLICATION NO. : 11/040391
DATED : April 29, 2008
INVENTOR(S) : Neal Y. Nakamura et al.

It is certified that error appears in the above-identified patent and that said Letters Patent is hereby corrected as shown below:

On the title page item:

(73) Assignee

"Time Warner Cable"

should read --Time Warner Cable, Inc.--

Signed and Sealed this

Twenty-eighth Day of October, 2008

JON W. DUDAS
*Director of the United States Patent and Trademark Office*